(12) United States Patent
Braithwaite et al.

(10) Patent No.: US 7,895,983 B2
(45) Date of Patent: Mar. 1, 2011

(54) RETENTION ASSEMBLY FOR A HYDROCARBON TRAP

(75) Inventors: Alex Braithwaite, Climax, MI (US);
Michael Willig, Santiago de Querétaro (MX); Frank Pfeiffer, Moensheim (DE); Stefan Maier, Besigheim (DE)

(73) Assignee: Mann + Hommel GmbH, Ludwigsburg (DE)

( * ) Notice: Subject to any disclaimer, the term of this patent is extended or adjusted under 35 U.S.C. 154(b) by 1052 days.

(21) Appl. No.: 11/703,795

(22) Filed: Feb. 8, 2007

(65) Prior Publication Data
US 2007/0186904 A1    Aug. 16, 2007

Related U.S. Application Data

(60) Provisional application No. 60/771,012, filed on Feb. 8, 2006.

(51) Int. Cl.
*F02M 35/10*    (2006.01)
*F02M 33/02*    (2006.01)

(52) U.S. Cl. .................... 123/184.21; 123/518; 285/81; 285/242; 285/330; 96/108

(58) Field of Classification Search ............ 123/184.21, 123/518, 519; 285/81, 242, 330, 360, 362, 285/401; 96/108
See application file for complete search history.

(56) References Cited

U.S. PATENT DOCUMENTS

| | | | |
|---|---|---|---|
| 2,386,562 A * | 10/1945 | Mahoney | ..................... 285/242 |
| 2,797,111 A | 6/1957 | Beazley | |
| 6,505,610 B2 * | 1/2003 | Everingham et al. | ........ 123/518 |
| 7,547,350 B2 * | 6/2009 | Callahan et al. | ................ 96/108 |
| 2004/0065197 A1 | 4/2004 | LaBarge | |

FOREIGN PATENT DOCUMENTS

EP    1110593 A1    6/2001

OTHER PUBLICATIONS

EP search report: EP07100649.

* cited by examiner

*Primary Examiner*—Noah Kamen

(57) ABSTRACT

A retention assembly secures a hydrocarbon trap within an air intake path of an internal combustion engine. The hydrocarbon trap is positioned within a first air tube, such as an outlet duct of a clean air filter. A second air tube, such as an inlet portion of a clean air duct assembly, is fitted over a portion of the first air tube to enclose the hydrocarbon trap within the first air tube. A clamp is fitted over both the first and second air tubes. A plurality of radially-extending, circumferentially-spaced protrusions that are formed on an inner surface of the second air tube pass through a respective plurality of apertures formed in the first air tube and, under radial compression exerted by the clamp, engage an outer surface of the hydrocarbon trap, thereby securing the trap within the first air tube.

26 Claims, 3 Drawing Sheets

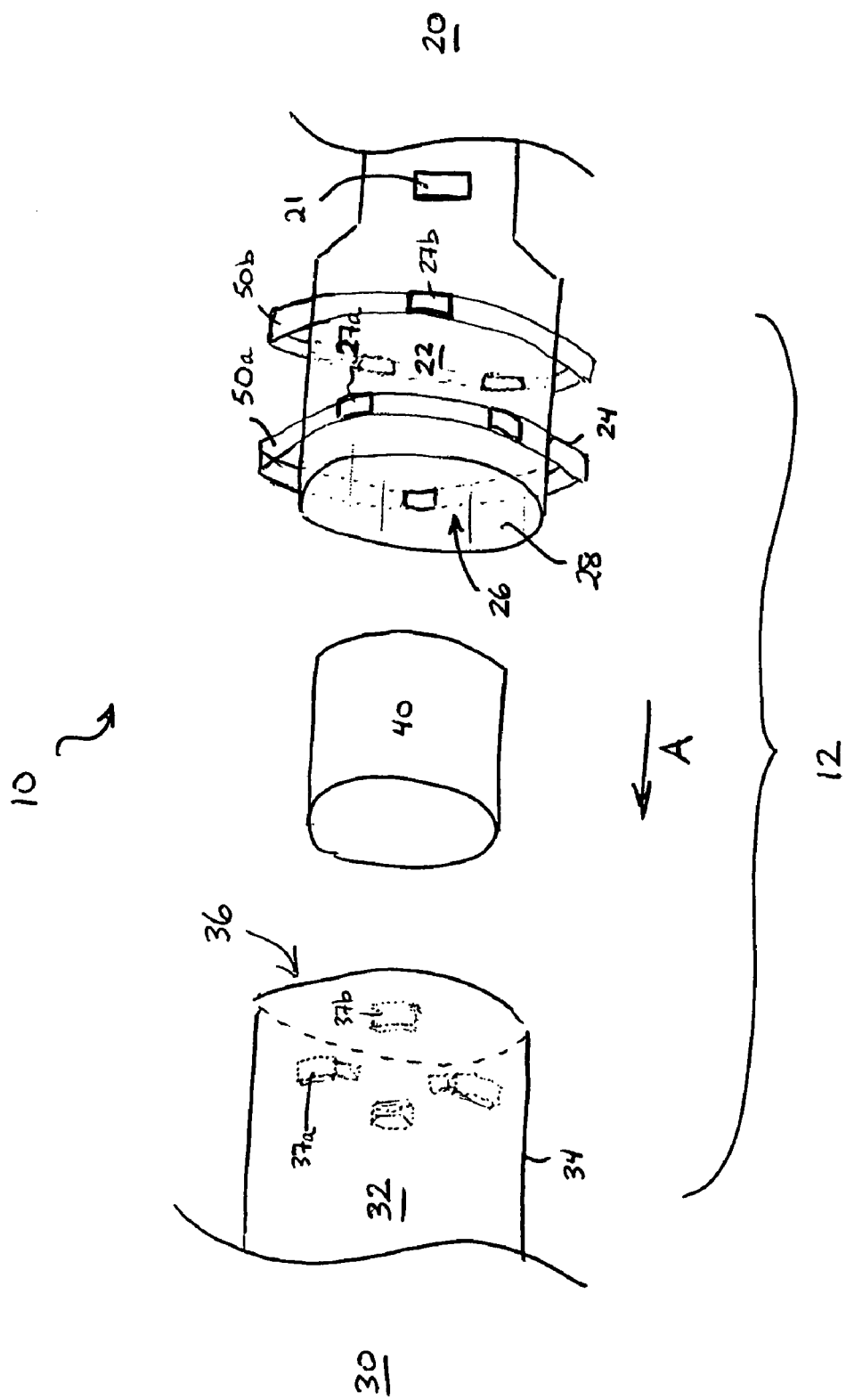

RETENTION ASSEMBLY FOR A HYDROCARBON TRAP

BACKGROUND OF THE INVENTION

1. Field of Invention

A retention assembly for a hydrocarbon trap is incorporated into an air induction system of a motor vehicle having a combustion engine in order to secure the trap and reduce hydrocarbon emissions.

2. Description of Related Art

Under the increasingly stringent California LEV (Low Emission Vehicle) II standards and United States Environmental Protection Agency (EPA) Tier II standards, automakers are required to dramatically reduce the amount of evaporative emissions from their gasoline-powered vehicles (by 75% for California's LEV II program and by 52.5% for the EPA's Tier 2 program). By 2007, all gasoline-powered vehicles will be required to meet these standards for evaporative emissions.

Evaporative emissions are hydrocarbon (HC) vapors that come from sources in a motor vehicle other than the exhaust system. Major sources of evaporative emissions include a motor vehicle's air intake system, fuel rail, exhaust gas recirculation system, and gas tank.

Hydrocarbon traps can be used to adsorb hydrocarbon vapors and reduce hydrocarbon emissions. Hydrocarbon traps typically comprise adsorbent media such as zeolites or activated carbon. The adsorbent media can be contained within, or supported by, a porous carrier or substrate. Useful hydrocarbon traps are commercially available, e.g., from Engelhard Corporation (Iselin, N.J.).

Hydrocarbon traps can be placed in the air induction system between a vehicle's air cleaner and engine where they can capture hydrocarbons that are escaping through the air intake when the engine is stopped. The incorporation of a hydrocarbon trap in this location is desirable because the air intake system is estimated to contribute as much as 50% of total evaporative emissions.

In use, the trap adsorbs hydrocarbons that are emitted when the engine is stopped. Once the vehicle is started and driven, the trap releases the hydrocarbons into the engine where they are burned. By trapping and later burning the hydrocarbon vapors, hydrocarbon emissions from the vehicle can be reduced.

Preferred hydrocarbon traps are designed to be tamper proof and free of on-board diagnostic (OBD) equipment. Hydrocarbon traps preferably remain effective for the life of the vehicle, have minimal impact on airflow into the engine, and can withstand exposure to ice, water, salt, dust, air filter surfactants and engine backfire.

As noted above, hydrocarbon traps typically comprise adsorbent media supported by a porous carrier or substrate. The substrate is inserted into an air tube such as the outlet duct of a vehicle's air cleaner. Preferably, the substrate is adapted to fit snugly within the outlet duct so as to prevent vibration of the substrate. Vibration may lead to undesired noise or even damage to the trap. Furthermore, a snug fit within the outlet duct causes a majority of the gases passing through the outlet duct to pass through (rather than around) the hydrocarbon trap, thus maximizing its efficiency. Gases passing through the hydrocarbon trap are directed via the clean air duct to the engine. To connect the air cleaner to the clean air duct, an inlet of the clean air duct is connected to the air cleaner outlet duct.

Thermal stresses acting upon an unsecured hydrocarbon trap can produce undesired results. The air cleaner outlet duct, which typically is made of synthetic resin material, and the trap substrate, which may, for example, be made of metal, are subject to changes in temperature due to, for example, environmental and engine-operating conditions. As a result of the respective thermal expansion coefficients of the trap substrate and the synthetic resin outlet duct under conditions of increasing temperature, the outlet duct resin will typically expand more than the trap substrate. Because the dimensions of the synthetic resin outlet duct will increase more than the dimensions of the trap substrate, the snug fit between the outlet duct and the substrate will be compromised, which may result in undesired noise, adsorptive inefficiency and possibly permanent damage to the trap.

Accordingly, it would be an advantage to provide a retention assembly capable of securing a hydrocarbon trap within a vehicle's air induction system, and specifically within an air cleaner outlet duct, in order to minimize the effects of thermal expansion coefficient mismatch and maximize the abatement of hydrocarbon emissions.

SUMMARY OF THE INVENTION

It is an object of the invention to provide an improved hydrocarbon trap arrangement for a motor vehicle.

Another object of the invention is to provide an apparatus for securing a hydrocarbon trap within a motor vehicle's air induction system.

A further object of the invention is to provide an efficient and secure hydrocarbon trap that is adapted to reduce hydrocarbon emissions over the lifetime of a motor vehicle.

These and other objects are achieved in accordance with the present invention by providing a retention assembly that is adapted to secure a hydrocarbon trap within an air intake path of an internal combustion engine. The retention assembly comprises a first air tube sized to contain a hydrocarbon trap therein, a second air tube adapted to fit over and engage an outer surface of the first air tube, and a clamp adapted to fit around both the first air tube and the second air tube and secure the first air tube to the second air tube.

As used herein, the term "clamp" is intended to refer to any device which exerts a clamping force on the hydrocarbon trap assembly. The clamp may be a reusable clamp similar to a conventional hose clamp, but it preferably will be a non-reusable locking fastening band such as a ratcheting cable tie.

According to one embodiment, the first air tube comprises an outlet duct of a clean air filter and is made of synthetic resin material. According to a further embodiment, the second air tube comprises an inlet portion of a clean air duct assembly and is made of rubber. The hydrocarbon trap is preferably incorporated into a motor vehicle's air induction system between the air cleaner and the engine.

The first and second air tubes are especially configured to operate in conjunction with a permanent clamp to secure the hydrocarbon trap. Formed in an outer wall of the first air tube are a plurality (e.g., three, four, five or more) of circumferentially-spaced apertures. The apertures are preferably equally spaced around the circumference of the first air tube. Preferably, at least three apertures are provided.

An inner surface of the second air tube comprises a like number of radially inwardly-extending, circumferentially-spaced protrusions. During assembly of the retention assembly, when the second air tube is fit over an outer surface of the first air tube, each of the protrusions extends through a respective one of each of the circumferentially-spaced apertures. When the clamp is tightened to secure the first air tube around the second air tube, the protrusions engage and exert pressure upon an outer surface of the hydrocarbon trap and thus secure the trap within the first air tube.

A method of securing a hydrocarbon trap within an air intake path of an internal combustion engine comprises (i) inserting a hydrocarbon trap into an open end of an outlet duct of a clean air filter (ii) placing an inlet to a clean air duct over the open end to enclose the hydrocarbon trap within the outlet duct, and (iii) securing a clamp over both the outlet duct and the clean air duct inlet such that radially-extending protrusions formed on an inner surface of the clean air duct inlet pass through apertures formed in an outer wall of the outlet duct and engage an outer surface of the hydrocarbon trap.

In order to more easily insert the trap into the outlet duct, the outlet duct is preferably heated to a temperature greater than the temperature of the trap. At temperatures above room temperature, the dimensions of the outlet duct, which is preferably made of synthetic resin, expand to increase the tolerance between the outlet duct and the trap.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 3 shows a perspective view of a fully-assembled retention assembly according to a further embodiment.

DETAILED DESCRIPTION OF PREFERRED EMBODIMENTS

Figure 1:
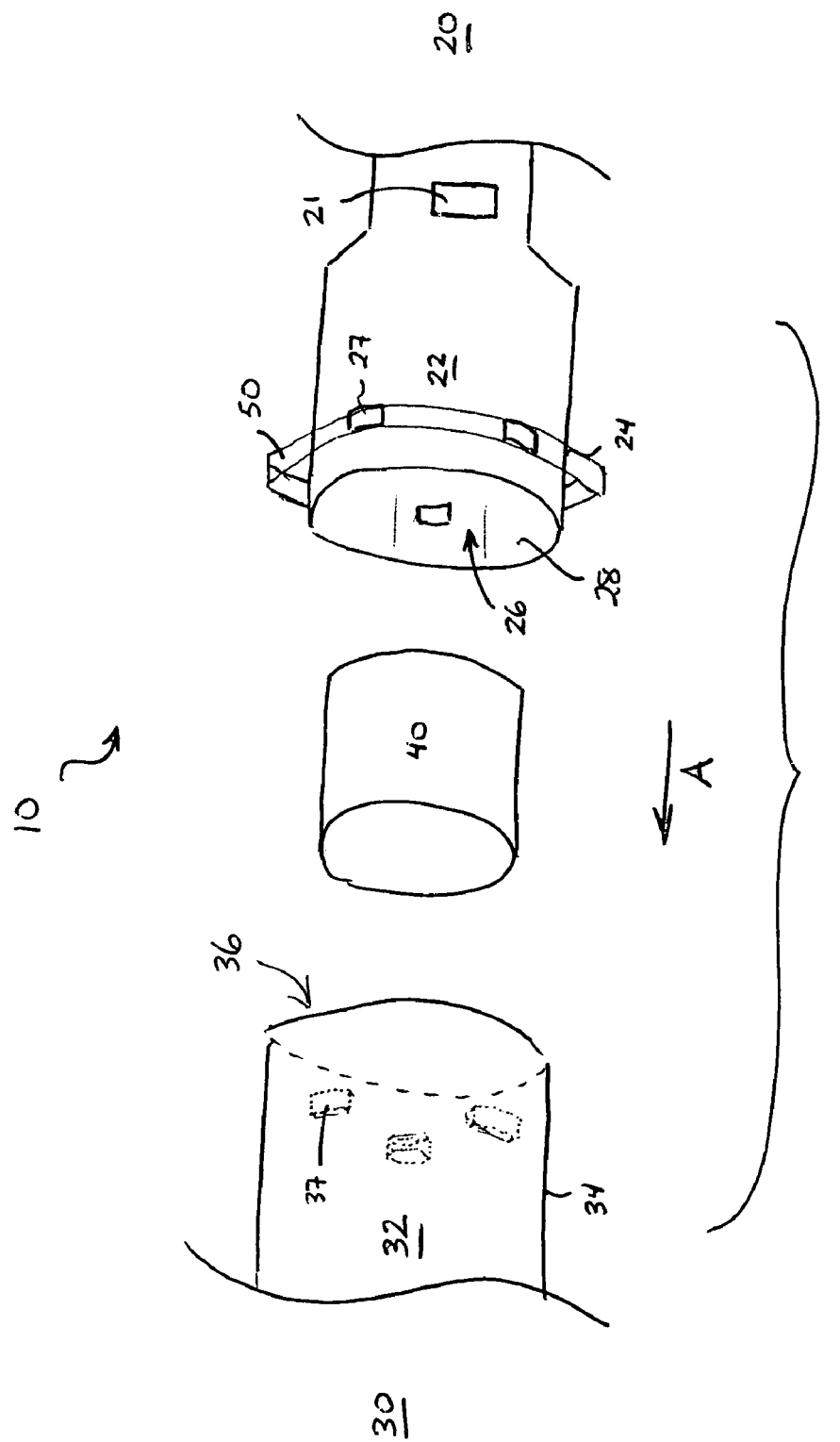
FIG. 1 shows an exploded view of a retention assembly for a hydrocarbon trap according to a preferred embodiment.

Referring to FIG. 1, an exploded perspective view of a portion of an air induction system 10 comprises a hydrocarbon trap retention assembly 12 installed in the vicinity of a motor vehicle engine (not shown). The air induction system functions to filter and meter the air intake flow into the engine.

The air induction system comprises an air cleaner 20 and a clean air duct 30. The air cleaner is connected to the clean air duct so that clean air that has been filtered by the air cleaner flows to the engine via the clean air duct. The direction of air flow through the air induction system (from the ambient to the engine) is shown by arrow A. Air cleaner 20 comprises an air cleaner outlet duct 22 located at a downstream side (engine side) thereof, and clean air duct 30 comprises a clean air duct inlet 32 located at an upstream side thereof The air induction system 10 may further comprise a mass air flow sensor 21. The mass air flow sensor (MAFS) can be positioned downstream from the air cleaner directly in the path of the air flow.

The air cleaner housing may advantageously be made of any injection-moldable or blow-moldable synthetic resin material, such as polyamide (nylon) or polypropylene. The clean air duct inlet is typically made of rubber but also may be fabricated from any other suitable material such as nylon or polypropylene.

The air cleaner outlet duct 22 includes an annular body 24 that defines a central cavity 26 therein. A plurality of circumferentially-spaced apertures 27 are formed in the annular body. The apertures extend completely through the annular body. As shown in FIG. 1, three apertures are spaced equally around the body. Whereas three apertures are illustrated, a larger number of apertures (e.g., 4, 5, 6 or more) can be provided. The plurality of apertures can be provided along a single circumferential line (as illustrated) or along multiple circumferential lines as described below. If desired, the apertures can be spaced irregularly or randomly to assure the ducts will always be positioned at a constant relative rotational orientation with respect to each other.

In the illustrated preferred embodiment, each of the apertures in the annular body preferably has a substantially rectangular shape defined by a length dimension, l, and a width dimension, w, where l>w, but other shapes are also possible. In FIG. 1, the length dimension of each aperture is shown running circumferentially with respect to the annular body. Alternatively, the length dimension of each aperture can run axially, or the orientation of the apertures can be variable (e.g., one aperture can have an orientation that is different from an adjacent aperture). Preferred rectangular apertures have a length of between about 9 to 11 mm and a width of between about 7 to 9 mm, though smaller and larger dimensions are possible. The apertures can also have other shapes, such as substantially square or circular. Thus, the number and spacing, as well as the size, orientation, and shape of the apertures can be varied.

In an assembled configuration, a hydrocarbon trap 40 is disposed within the central cavity 26 of the outlet duct. The trap 40 can be inserted into the outlet duct 22 via open end 28.

Hydrocarbon trap 40 preferably comprises a substrate having at least one hydrocarbon adsorbent material supported thereon. The substrate may be made of any suitable material such as metal, synthetic resin (plastic), ceramic, paper, silicate, active carbon, etc. In one preferred embodiment the substrate is made of metal (e.g., a porous metal monolith). The hydrocarbon adsorbing material can comprise carbon, activated carbon, zeolites, or mixtures thereof and can be coated onto the substrate using known methods such as wash-coating, dip-coating, electro-coating and spray-coating. The hydrocarbon trap 40 may take any suitable configuration, but preferably will have a cylindrical configuration.

In order for the hydrocarbon trap to fit within the annular body, the inner diameter of the annular body must be slightly greater than the outer diameter of the hydrocarbon trap. The dimensional clearance between the trap and the annular body is preferably about 1 mm or less (e.g., about 0.5 or 0.75 mm), which provides a relatively tight clearance.

Due to the tight clearance, in a preferred embodiment the trap is inserted into the outlet duct when the temperature of the outlet duct is greater than the temperature of the trap. By heating the outlet duct, which is made of synthetic resin, the outlet duct will expand slightly and the trap can be more easily inserted. For example, during the insertion, the hydrocarbon trap can be at room temperature and the synthetic resin outlet duct can be at a temperature greater than room temperature.

The synthetic resin outlet duct is preferably a synthetic resin part that can be formed by injection molding. Injection molding comprises injecting molten synthetic resin material into a part-shaped mold, cooling the molten synthetic resin to form a solid part, removing the part from the mold, and further cooling and optionally finishing (buffing, trimming, etc.) the part. Advantageously, the trap can be inserted into the outlet duct during the final cooling step.

The outlet duct and the plurality of apertures formed therein are preferably created simultaneously during injection molding of the outlet duct. Alternatively, the plurality of apertures can be formed during post-injection molding processing of the part, such as by cutting or drilling.

Still referring to FIG. 1, the clean air duct inlet 32 is adapted to be inserted over an outer surface of the outlet duct, thus forming an air passage from the air cleaner 20 to the clean air duct 30. According to a preferred embodiment, the clean air duct assembly, including the clean air duct inlet, is made of rubber. Thus, the hydrocarbon trap is enclosed within the air cleaner outlet duct and positioned downstream from the air cleaner and upstream from the clean air duct.

The clean air duct inlet comprises an annular body 34 that defines a central cavity 36 that is adapted to fit over an outer surface of the outlet duct. In order to promote a tight seal between the clean air duct inlet and the air cleaner outlet duct, the clearance between the two parts is preferably about 1 mm or less (e.g., about 0.5 or 0.75 mm). That is, in order for the clean air duct inlet to fit over an outer surface of the annular body, the inner diameter of the clean air duct inlet is preferably slightly greater than the outer diameter of the annular body 24. Because the clean air duct inlet is preferably made of rubber, the clean air duct inlet can be stretch-fit over the outer surface of the annular body.

Formed on an inner surface of the clean air duct inlet are a plurality of circumferentially-spaced radially-extending protrusions 37. As shown in FIG. 1, three protrusions 37 are spaced equally around the inner surface of the clean air duct inlet. Whereas three protrusions are illustrated, a larger number (e.g., 4, 5, 6 or more) can be provided. The clean air duct inlet and protrusions are preferably manufactured as a unitary part (e.g., via injection molding). The number of protrusions is preferably equally to, but may be less than, the number of apertures.

Preferred protrusions have the approximate shape of a rectangular prism, defined by a height dimension, h, a length dimension, l, and a width dimension, w, such that l>w. Height, h, is defined as the maximum axial distance that a protrusion extends inwardly from the inner surface of the clean air duct inlet. The protrusions can also have other shapes, such trapezoidal, or a square or circular prism. Preferred protrusions have a length of between about 7 to 9 mm and a width of between about 5 to 7 mm, though smaller and larger dimensions are possible.

The clean air duct inlet is adapted to slideably fit over an outer surface of the outlet duct such that each protrusion formed on the inner surface of the clean air duct inlet aligns with and extends through a respective aperture formed in the annular body. The protrusions are dimensioned to pass completely through the apertures and extend a finite distance (interference distance) beyond the inner surface of the central cavity 26. A preferred interference distance is about 2 mm. That is, in the absence of a hydrocarbon trap within the central cavity, each protrusion will extend about 2 mm beyond the inner surface of the annular body 24. The interference distance can be less than 2 mm (e.g., 1.5 mm) or greater than 2 mm (e.g., 2.5 or 3 mm).

In an assembled configuration, which includes a hydrocarbon trap within the central cavity of annular body, the protrusions engage an outer surface of the hydrocarbon trap. Preferably, an axially distal end-face of each protrusion engages the outer surface of the hydrocarbon trap. Clamp 50 can be aligned over apertures 27 (i.e., around both the clean air duct inlet and the outlet duct) and tightened in order to further press (i.e., compress) the protrusions 27 against the outer surface of the hydrocarbon trap 40 and thus secure the trap within the central cavity 26 of outlet duct 22. A preferred clamp 50 is a non-removable clamp. Such a clamp is not designed as a user-serviceable part and is intended to remain clamped for the lifetime of the vehicle.

Figure 2:
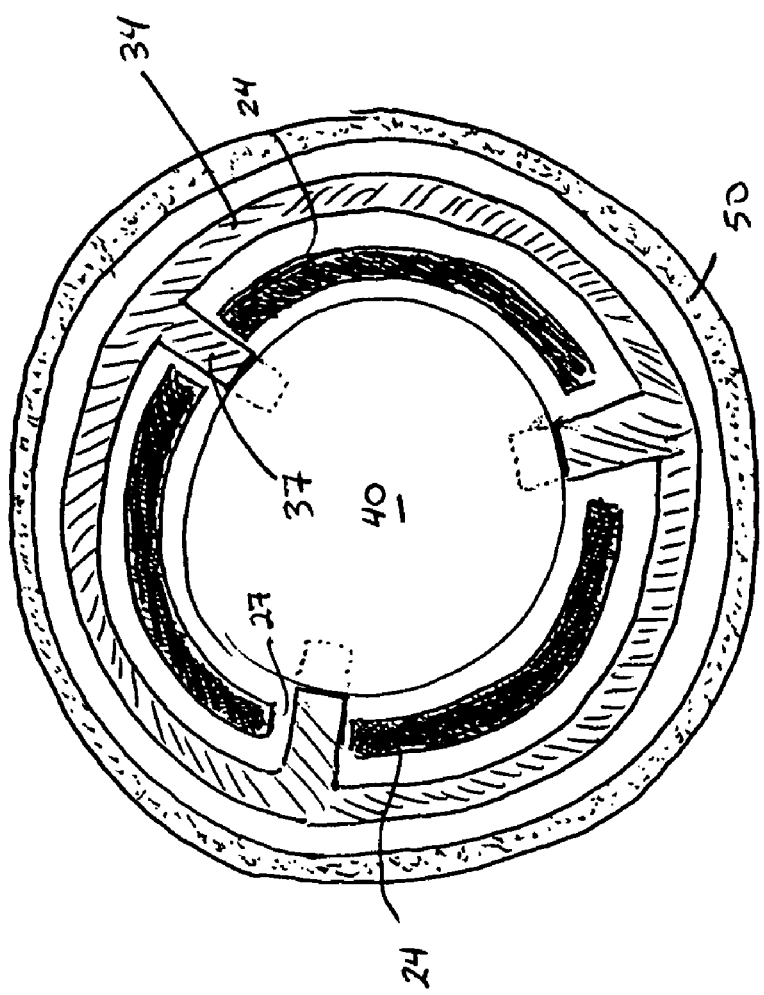
FIG. 2 shows a cross sectional view of a fully-assembled retention assembly.

In an assembled configuration each protrusion is preferably in a state of axial compressive stress (i.e., compressed along the height direction). A cross sectional view of an assembled retention assembly according to one embodiment is shown in FIG. 2. The extent to which the protrusions are compressed (due to the inclusion of the trap) is illustrated by broken lines. The compressive stress exerted around the periphery of the hydrocarbon trap secures the trap within the annular body during operation of the motor vehicle, particularly at elevated temperatures.

In a preferred embodiment, the hydrocarbon trap is self-regenerating. In operation, the hydrocarbon trap adsorbs hydrocarbons released by the engine when the engine is not running and desorbs these hydrocarbons when the engine is running. Desorption of the adsorbed hydrocarbons occurs due to the moderate to high flow rate of clean air that is drawn through the trap when the engine is running. Desorbed hydrocarbons travel through the clean air duct and into the engine where they are burned. Thus, by installing the hydrocarbon trap in the air induction system, the trap can remain effective over the lifetime of the vehicle.

According to a preferred method of assembling the retention assembly, a hydrocarbon trap is inserted into an open end of an outlet duct of an air cleaner, a clean air duct inlet is slideably fit over the open end of the outlet duct to enclose the hydrocarbon trap therein, and a non-removable clamp is secured around both the outlet duct and the clean air duct inlet. By securing the clamp, radially-extending protrusions formed on an inner surface of the clean air duct inlet pass through apertures formed in the outlet duct and engage an outer surface of the hydrocarbon trap thus securing the trap within the outlet duct.

FIG. 3 shows a hydrocarbon trap retention assembly according to an alternate embodiment. Two clamps 50a, 50b are provided in the apparatus shown in FIG. 3. Each clamp is secured over a plurality of circumferential-spaced protrusion-aperture pairs such that a first array of protrusions 37a pass through a first array of apertures 27a and engage the hydrocarbon trap at a first set of positions around its outer surface, and a second array of protrusions 37b pass through a second array of apertures 27b and engage the hydrocarbon trap at a second set of positions around its outer surface. The first and second apertures arrays are illustrated offset from each other. By providing a second pairing of protrusions/apertures the hydrocarbon trap can be efficiently and stably secured within the air cleaner outlet duct during operation of the engine.

While the air cleaner outlet duct, clean air duct inlet and hydrocarbon trap are described herein as comprising circular cross-sections, it is to be understood that non-circular (e.g., elliptical or polygonal) cross-sections may be used.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A retention assembly adapted to secure a hydrocarbon trap within an air intake path of an internal combustion engine, the assembly comprising:

a first air tube sized to contain a hydrocarbon trap therein;

a second air tube adapted to fit over and engage an outer surface of the first air tube; and a clamp adapted to fit around both the first air tube and the second air tube and secure the first air tube to the second air tube, wherein an outer wall of the first air tube comprises a plurality of circumferentially-spaced apertures, and the second air tube comprises a plurality of radially-extending, circumferentially-spaced protrusions formed on an inner surface thereof, each of said protrusions being adapted to extend through a respective one of each of said circumferentially-spaced apertures and engage an outer surface of a hydrocarbon trap contained within the first air tube when the first and second air tubes are secured together by said clamp.

2. The apparatus according to claim 1, wherein the first air tube is an outlet duct to an air cleaner.

3. The apparatus according to claim 1, wherein the first air tube is made of synthetic resin.

4. The apparatus according to claim 1, wherein the second air tube comprises an inlet portion of a clean air duct assembly.

5. The apparatus according to claim 1, wherein the second air tube is made of rubber.

6. The apparatus according to claim 1, wherein the hydrocarbon trap comprises a metal substrate.

7. The apparatus according to claim 1, wherein the second air tube and the protrusions comprise a unitary part.

8. The apparatus according to claim 1, wherein the apertures are equally spaced.

9. The apparatus according to claim 1, wherein the first air tube comprises three, four, or five apertures.

10. The apparatus according to claim 1, wherein the clamp is a non-removable clamp.

11. The apparatus according to claim 1, wherein the clamp is aligned over the protrusions.

12. The apparatus according to claim 1, wherein the second air tube has an inner circumference which is greater than the outer circumference of the first air tube.

13. The apparatus according to claim 1, wherein the unclamped clearance between an outer circumferential surface of the first air tube and an inner circumferential surface of the second air tube is about 1 mm or less.

14. The apparatus according to claim 1, wherein the first air tube has a wall thickness that is about 2 mm less than the height of the protrusions.

15. The apparatus according to claim 1, wherein each protrusion has a cross-sectional area that is equal to or less than the cross-sectional area of each aperture.

16. The apparatus according to claim 1, wherein the protrusions have a rectangular cross section and the apertures have a rectangular cross section.

17. The apparatus according to claim 16, wherein each protrusion has a length of between about 7 to 9 mm and a width of between about 5 to 7 mm, and each aperture has a length of between about 9 to 11 mm and a width of between about 7 to 9 mm.

18. The apparatus according to claim 1, wherein the first air tube is provided with at least three apertures, and the second air tube is provided with a like number of protrusions arranged to register with the apertures of the first tube.

19. An air induction system of an internal combustion engine comprising the retention assembly according to claim 1.

20. The air induction system according to claim 19, wherein the retention assembly is positioned between an air cleaner for the engine and the engine.

21. A method of securing a hydrocarbon trap within an air intake path of an internal combustion engine, said method comprising:

inserting a hydrocarbon trap into an open end of an outlet duct of an air cleaner;

placing a clean air duct inlet over the open end to enclose the hydrocarbon trap within the outlet duct; and securing a clamp over both the outlet duct and the clean air duct inlet;

wherein during said step of securing, radially-extending protrusions formed on an inner surface of the clean air duct inlet engage an outer surface of the hydrocarbon trap.

22. The method according to claim 21, wherein during the step of inserting, the temperature of the outlet duct is greater than the temperature of the hydrocarbon trap.

23. The method according to claim 21, wherein the hydrocarbon trap comprises a metal substrate, the outlet duct is made of synthetic resin, and the clean air duct inlet is made of rubber.

24. The method according to claim 21, wherein the unclamped clearance between an outer circumferential surface of the outlet duct and an inner surface of the clean air duct inlet is about 1 mm or less.

25. The method according to claim 21, wherein each protrusion is compressed by physical contact with an outer surface of the hydrocarbon trap when the clamp is secured.

26. The method according to claim 21, wherein each protrusion has a length of between about 7 to 9 mm and a width of between about 5 to 7 mm, and each aperture has a length of between about 9 to 11 mm and a width of between about 7 to 9 mm.

* * * * *